United States Patent
Hamaguchi et al.

(10) Patent No.: US 6,698,932 B2
(45) Date of Patent: Mar. 2, 2004

(54) BEARING ASSEMBLY FOR A WORK IMPLEMENT ON A CONSTRUCTION MACHINE

(75) Inventors: Masahiko Hamaguchi, Hirakata (JP); Yoshiaki Shimada, Hirakata (JP); Monta Kondou, Hirakata (JP)

(73) Assignee: Komatsu, Ltd., Tokyo (JP)

( * ) Notice: Subject to any disclaimer, the term of this patent is extended or adjusted under 35 U.S.C. 154(b) by 14 days.

(21) Appl. No.: 10/023,815

(22) Filed: Dec. 21, 2001

(65) Prior Publication Data

US 2002/0081046 A1 Jun. 27, 2002

(30) Foreign Application Priority Data

Dec. 22, 2000 (JP) ........................................ 2000-390251

(51) Int. Cl.[7] .............................................. F16C 33/10
(52) U.S. Cl. ........................ 384/275; 384/296; 384/297
(58) Field of Search ................................ 384/275, 276, 384/295, 296, 297, 424, 420, 396; 414/723; 403/157, 158; 37/144

(56) References Cited

U.S. PATENT DOCUMENTS

| | | | | |
|---|---|---|---|---|
| 1,439,297 A | * | 12/1922 | De Coninck | ................ 384/396 |
| 1,868,687 A | * | 7/1932 | Bijur | ........................... 384/396 |
| 4,203,684 A | * | 5/1980 | Stecklein | ..................... 403/158 |
| 4,400,898 A | * | 8/1983 | Christensen et al. | ........ 403/157 |
| 4,607,977 A | * | 8/1986 | Varnelis et al. | .............. 403/154 |
| 4,917,509 A | * | 4/1990 | Takano | ........................ 384/275 |
| 4,932,795 A | * | 6/1990 | Guinn | ........................ 384/276 |
| 5,509,738 A | * | 4/1996 | Haynes et al. | .............. 384/275 |

* cited by examiner

Primary Examiner—Thomas R. Hannon
(74) Attorney, Agent, or Firm—Varndell & Varndell, PLLC (57) ABSTRACT

A bearing assembly used for a work implement of a construction machine with an excellent bearing performance, excellent durability and good maintenance. A pair of first bushings with flanges and a pair of second bushings with flanges are fixed respectively in the bore of the boss and the brackets in a manner such that the first bushing flange faces the second bushing flange. An anti-wear material applied on at least one of the sliding surfaces of the flanges of the first and second bushing flanges that face each other. The first bushings with flanges fixed in both sides of the bore of the boss can be a double-structural member including an outer tubular member and an inner sliding member fixed in the bore of the outer tubular member respectively. Furthermore, the first bushings can be a double-structural member including an outer tubular member and an inner sliding member fixed in the bore of the outer tubular member.

3 Claims, 8 Drawing Sheets

BEARING ASSEMBLY FOR A WORK IMPLEMENT ON A CONSTRUCTION MACHINE

TECHNICAL FIELD

This invention relates to a bearing assembly for a work implement of a construction machine.

BACKGROUND OF THE INVENTION

Figure 7:
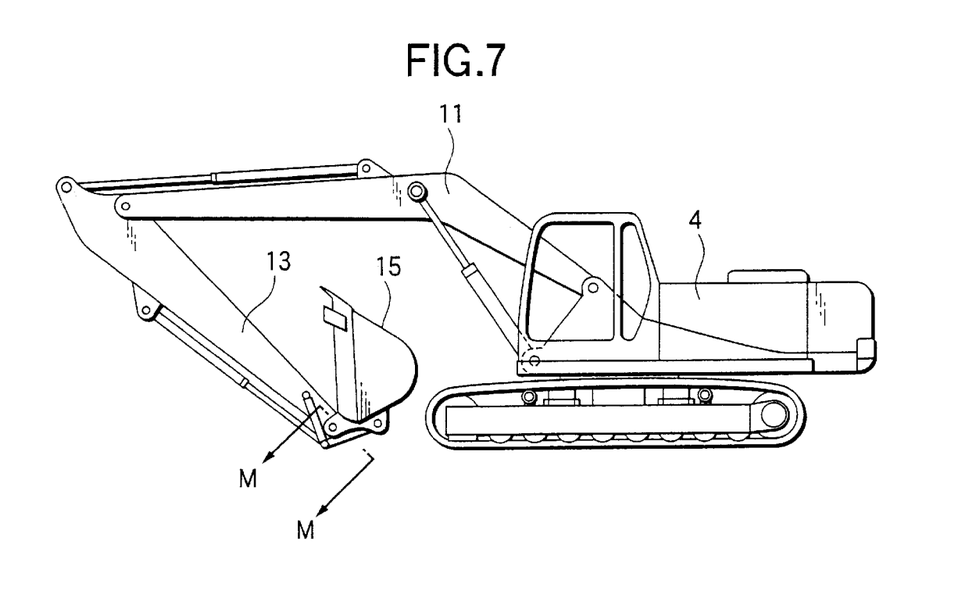
FIG. 7 is a side view of a hydraulic excavator.

A rotational member for a work implement on a construction machine that includes a bearing assembly. The bearing assembly can include a boss portion of a first member (hereinafter referred to as "boss") that is positioned and pivotally connected by a pin. The pin is arranged between a pair of bracket portions of a bifurcated member. FIG. 7 shows an example of a work implement on a excavator. The work implement has a boom 11 that is pivoted vertically in the front portion of the body frame 4, an arm 13 that is articulately connected at the end portion thereof, and a bucket 15 that is pivotally connected to the arm 13. The connections between the pivoting members of the work implement are provided with a bearing assembly at each pin joint.

Figure 8:
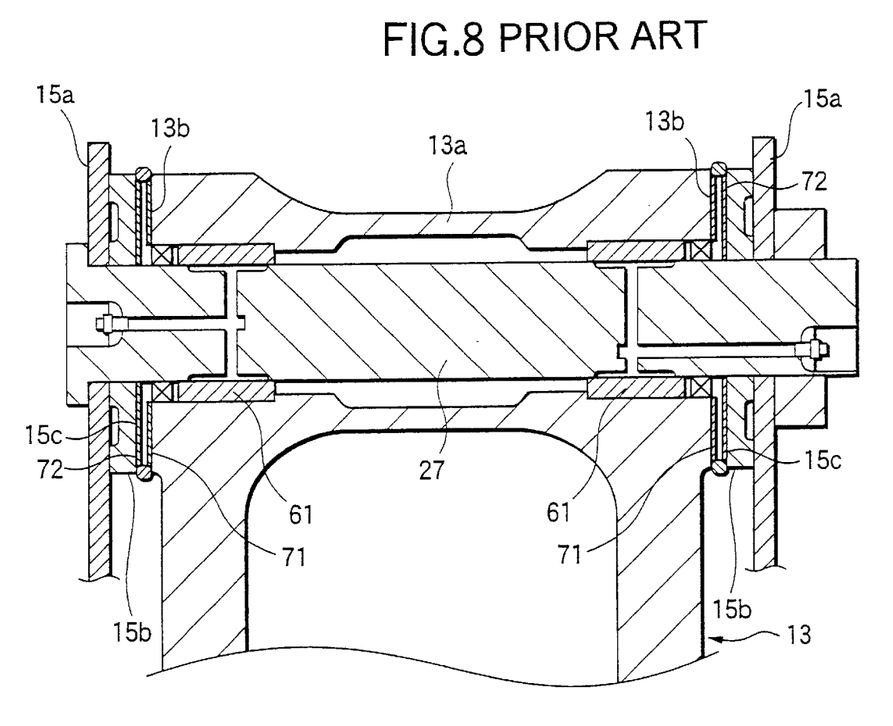
FIG. 8 is a cross sectional view of a bearing assembly of the prior art.
Figure 9:
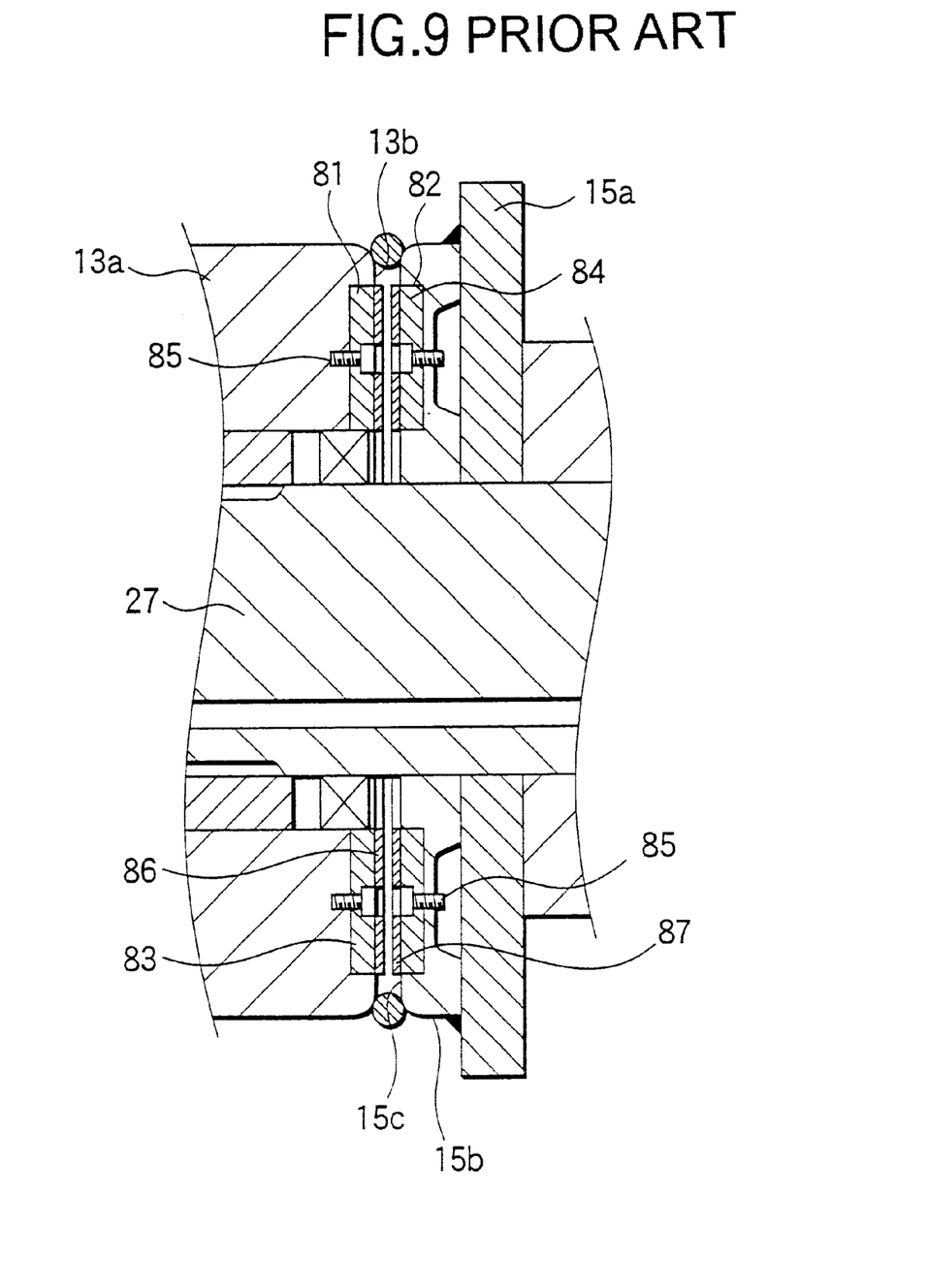
FIG. 9 is a cross sectional view of another bearing assembly of the prior art.

Japanese patent application 1995-354061, filed on Dec. 28, 1995 and assigned to Hitachi Construction Machinery shows a known bearing assembly. FIGS. 8 and 9 show a cross sectional view of the bearing assembly described in the above-mentioned Japanese application, which is seen along line M—M in FIG. 7. As shown in FIG. 8, the arm 13 has a boss 13a at the end portion thereof. A pair of bushings 61, 61 are fixed on opposing sides of a bore defined within the boss 13a, so that a pin 27 can slide axially in the bore of the boss 13a. A pair of bosses 15b, 15b are formed on a pair of bifurcated flanges or a pair of brackets 15a, 15a, which are positioned on the opposing sides of the end portion of the bucket 15. The pin 27 is inserted through the bore defined within the brackets 15a, 15a and the bushing 61, 61.

In the description of the aforesaid Japanese application, it is explained that the use of a heavy lubricant will prevent the bushing 61 from overheating while sliding around the pin 27, when the bushing is subjected to a heavy radial load. The use of a heavy lubricant also prevents vibration and frictional wear. Sintered hard alloy metals or ceramics such as tungsten carbide and the like are disposed on both of the end surfaces 13b, 13b of the boss 13a, as well as the opposing inner surfaces 15c, 15c of the bosses 15b that extends inward towards the brackets 15a, 15a. The brackets 15a, 15a face the end surface 13b, 13b and form anti-wear layers 71 and 72 respectively. The Japanese patent application explains that the anti-wear layers 71 and 72 have a hardness equal to earth and sand, so that the bushing surfaces are difficult to scratch, when earth, sand and the like get between the sliding surfaces of the bushings 61, 61. The anti-wear layers prevent the deleterious scouring action of the sand on the sliding surfaces of the bushing flange, which would result in abrasive wear.

FIG. 9 shows also another embodiment of the above-mentioned Japanese application. In the drawing, both end surfaces 13b, 13b of the bosses 13a and opposing inner sides 15c, 15c of the bosses 15b, 15b, which extend inward toward the brackets 15a, 15a, define a pair of annular grooves 81, 82, where a pair of rings 83, 84 are respectively installed. The rings 83, 84 are fixed by a number of screws 85. A pair of anti-wear layers 86, 87, which are formed by a spray coating process with sintered hard alloy metal or ceramics such as tungsten carbide prior to its installation, are positioned on the facing sliding surfaces of the rings 83, 84.

The following are drawbacks associated with the conventional technology described in the above-referenced Japanese patent application.

(1) Since the anti-wear layers 71, 72 and 86, 87 are bonded directly to the sliding surface of the annular rings by the spray deposit of the sintered hard alloy metal such as tungsten carbide; they can be equal in hardness to earth and sand containing aluminum, silica, quartz and feldspar, but not significantly harder. This results in quick degradation of the anti-wear layers 71, 72. In addition, the anti-wear layer made by spray forming is extremely thin, ranging from tens to hundreds of microns, resulting in a relatively short wear life. Furthermore, when hard gravel and the like as small as several millimeters get into the space between the rings 83 and 84 and a strong force is being applied, impressions that are created by the gravel reach the base metals through the relatively thin anti-wear layers 71 and 72 or 86 and 87 disposed thereon. This can increase the possibility of cracks and peeling of the anti-wear layers starting from the impressed portions.

(2) When the anti-wear layers 71, 72 or 86, 87 are worn out and damaged as described in (1), it very difficult to repair these parts with this particular type of bearing assembly on site. This leads to poor machine maintenance.

(3) With this type of bearing assembly, the ring shaped members 83, 84 and the anti wear layers 86, 87 are fastened by a number of screws 85 to both end surfaces 13b, 13b of the boss 13a and the opposing inner sides 15c of the bracket bosses 15b (FIG. 9). The ring shaped members 83, 84 repeat a reverse turn with the bucket 15 pivoted about the pin 27 with respect to the arm 13. This causes the screws 85 to be repeatedly subjected to lateral forces in opposite directions, which reduces the tightening force or axial tension of the screws 85 and raises the possibility that screws will loosen and fall free whenever the rings 83, 84 are subject to an additional thrust force. Thus, the described bearing assembly can suffer from the drawback of poor durability.

The present invention is directed to overcoming the problems described above. It is the object of the present invention to provide a bearing assembly for a work implement on a construction machine that has a significant bearing performance, excellent durability, and easy maintenance.

BRIEF DESCRIPTION OF THE DRAWINGS

For better understanding of the present invention, reference may be made to the accompanying drawings in which.

DISCLOSURE OF THE INVENTION

In order to achieve the objective mentioned above, the first embodiment provides a bearing assembly for a work implement of a construction machine, wherein a boss of a first member is articulately connected by a pin to a pair of brackets of a second member. A pair of first bushings with flanges and a pair of second bushings with flanges (hereinafter occasionally referred to as "bushings") are respectively fixed in a number of bores drilled within the bosses and the brackets. The bores in the bosses and brackets are aligned along a common axis, so that the first bushing flanges face the second bushing flanges. Anti-wear material is applied on at least one of the sliding surfaces of the first and second bushing flanges.

The first embodiment provides the following operations and advantageous effects.

(1) The bushings can be easily replaced when damaged or worn without having to remove the sliding surfaces of the brackets and the bosses.

(2) The selection of the material used for the bushings can be tailored to the desired abrasive resistance and slideablity (low friction characteristic), independent of the material used for the brackets and the boss.

(3) In addition to the selection of an optimum material for the bearing portion of the bushing fixed within the boss, the anti-wear layers can be applied to the surface of the bushing flange facing the brackets. These two improvements provide protection against abrasive wear, thereby assuring excellent durability and excellent bearing performance.

(4) The anti-wear layers can be applied on the sliding surfaces of the bushing flange as a unit. If the anti-wear layer is applied by spray, such as for forming a sintered hard alloy metal, a highly durable anti-wear layer can be provided at low cost due to savings in time and labor during the manufacturing process.

(5) A bushing of a low thermal equivalent (such as having a small size or a low mass) can be improved by a light heating in a furnace or other similar device. For example, the anti-wear layers can be brazed on the sliding surfaces on an annular shaped anti-wear plate, which was previously made by sintering, thereby creating an annular sintered hard alloy metal. With bushings so made, damage that could result from a thin anti-wear layer, such as from potential cracking and peeling through the impressions form thereon, can be prevented. This remarkably improves the wear life of the bushing and empowers the bushing of the present invention with the potential for wide application in a heavy-duty construction machine.

(6) Since the principal function of the bushing fixed in the bore of the bracket is to support the pin only, a plain steel can be sufficient for the base metal of the bushing. Accordingly, a bushing with excellent durability against abrasive wear can be made by applying the anti-wear layer on the sliding end surface of flange portion of a plain steel by the same manufacturing methods as described in (5).

This provides a bushing with excellent durability at low cost.

(7) It is preferable that the respective bushings of the boss and brackets be different in their abrasive resistance.

This allows a low priced metal to be used for the bushing of the bracket, because it does not need to be particularly hard. This low-priced bushing can be replaced with fresh parts during periodic maintenance, which results in enhancing the overall durability while reducing the total cost.

As a result, the bearing assembly of the present invention provides significant bearing performance, excellent durability, and easy maintenance at low cost.

The second embodiment of the present invention provides a bearing assembly used for a work implement of a construction machine wherein a boss and a pair of brackets are pivotally connected by a pin. A pair of first bushings and a pair of second bushings are fixed respectively in the bore of the boss and the brackets in a manner such that each of the first bushing flanges faces each of the second bushing flanges. An anti-wear material is applied on at least one of the sliding surfaces of flanges facing each other. Each of the first bushings is a double-structural member including an outer tubular member and an inner sliding member fixed in the bore of the outer tubular member.

The second embodiment provides operations and advantageous effects as described below, which are similar to those of the first embodiment. The double-structural member including an outer tubular member with flange and an inner sliding member inserted in the bore thereof allows flexibility in selecting the materials used for the bushing flange portion and pin sliding portion. This combination results in providing such advantageous effects as having both an excellent bearing performance and durability by using a metal that has a great slideablity in the absence of abrasive wear and judder (vibration), while also providing a protective anti-wear layer that is abrasive resistance and a heavy shock load resilient, and using the same base metal for each. Furthermore, replacing the damaged and worn parts of only the outer tubular members and the inner sliding members therein reduces the cost of replacement, and thereby reduces maintenance costs.

The material and manufacturing methods for the tubular members with flanges fixed in the bores within the boss can be selected based on durability, desired maintenance periods, and costs; such as in the same manner as the bushings fixed in the bores of the brackets described in the first embodiment. As a result, the bushings fixed in the bores of the boss also provide an excellent bearing performance, excellent durability and easy maintenance at low cost.

The third embodiment is also directed to a bearing assembly used for a work implement of a construction machine where a boss and a pair of bracket are articulately connected by a pin. In the third embodiment, the bearing assembly is comprised of a pair of first opposing bushings fixed in the bores of the boss in a manner such that each of the bushing flanges face towards the opposing inner brackets, and a pair of double-structural members including an outer tubular member and an inner sliding member are respectively fixed in the bore of the outer tubular member.

The third embodiment of the present invention provides the following operations and advantageous effects.

(1) A pair of bushings fixed into the bores of the boss prevents its flange portions from wearing away and allows repair mechanics to easily replace damaged or worn bushings with new ones. Furthermore, the material for the bushings pressed within the boss can be specifically selected for its ability to slide smoothly inside of the tubular member and to resist abrasive wear on the flange sliding surfaces of the bushing independent of the material used for the boss.

(2) The double-structural member including an outer tubular member with flange and an inner sliding member pressed into the bore thereof allows flexibility in selecting the materials used for the flange portion of the former and the sliding portion of the latter that contacts with the pin 27. This provides synergistic or compatible advantageous effects as having an excellent bearing performance and an excellent durability by using a metal having both great slideablity in the absence of abrasive wear and judder, and providing an anti-wear layer resisting abrasive wear and heavy shock load.

Furthermore, no repair of the boss itself is required, and only replacement of damaged and worn parts of either the outer tubular member with flange or the inner sliding member is required. This results in the reduction of maintenance expenses.

The selection of material and manufacturing methods for the anti-wear layers positioned between and disposed on the flange of the outer tubular member and the end of the bracket is carried out in such a way that the flange sliding surface of the outer tubular member within the boss is harder than the anti-wear layer applied on the end of the bracket facing it. In the replacement of the worn or damaged outer tubular member fixed in the boss, or the inner sliding member alone, can be accomplished every time there is periodic maintenance. This arrangement improves the durability of the bushing as a whole and reduces the total cost. Thus, the bearing assembly of the present invention has a significantly improved bearing performance, excellent durability and easy, low-cost maintenance.

The fourth embodiment of the present invention provides a bearing assembly that has the anti-wear layers situated on the flange sliding surfaces of the bushings that face the brackets based on the third embodiment. The fourth embodiment provides the following advantageous effects as follows, in addition to of those of the third embodiment. The flange sliding surfaces of the bushing fixed in the bore of the boss facing towards the brackets have anti-wear layers applied thereon, thereby reducing wear on the bracket. This arrangement provides flexibility in selecting the material and manufacturing methods for the anti-wear layer for durability and abrasive wear. Consequently, a wide and flexible selection of durable materials and maintenance methods are available, so that the cost of the anti-wear layer is reasonable.

Figure 1:
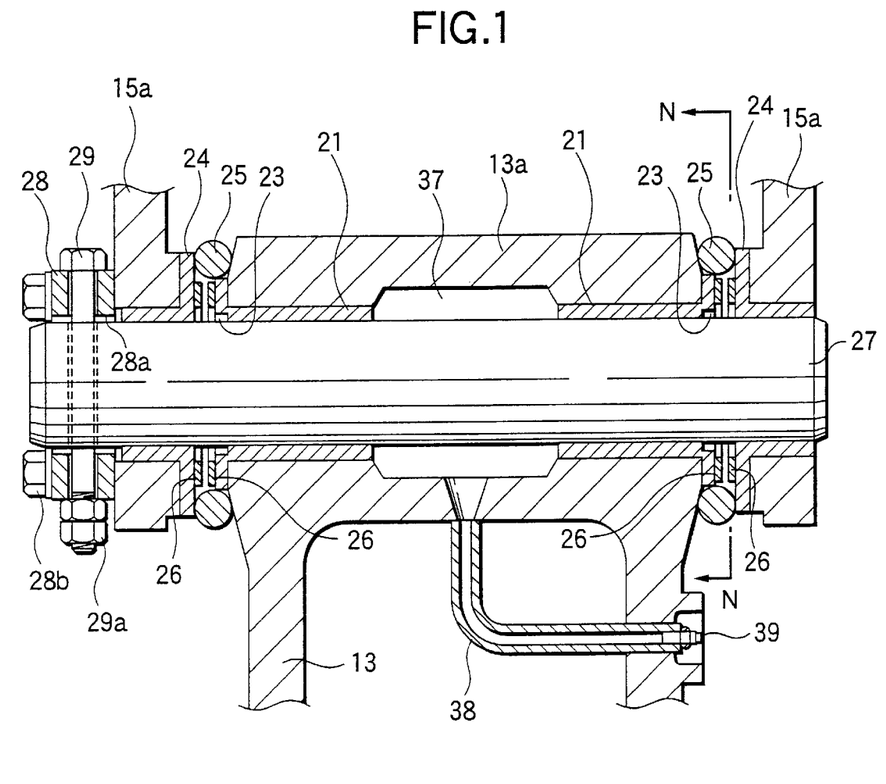
FIG. 1 is a cross sectional view representing a bearing assembly for a work implement on a construction machine incorporating the first embodiment of the present invention.

Referring to FIGS. 1 to 8, all the embodiments of the present invention will be explained. A work machine is based on the hydraulic excavator as shown in FIG. 7. FIG. 1 is a cross sectional view of the bearing assembly for a construction machine.

Figure 2:
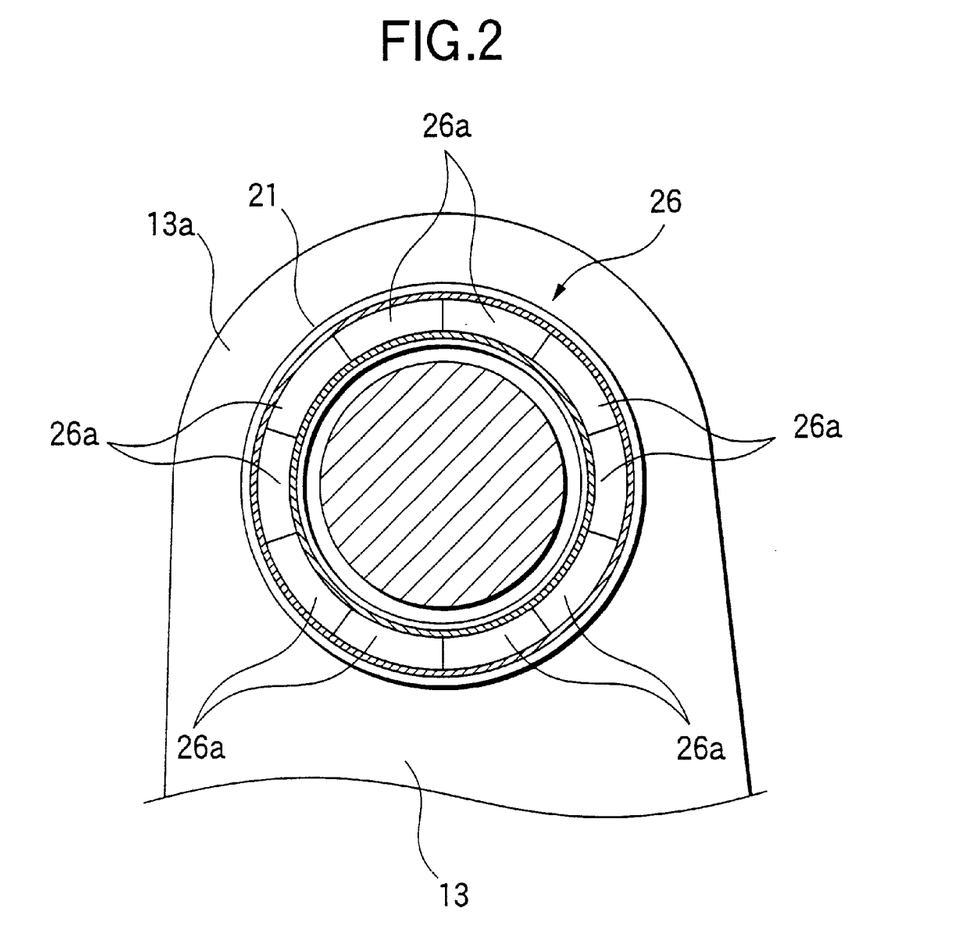
FIG. 2 is a cross sectional view taken along line N—N of FIG. 1

The first embodiment will be now explained. Referring to FIGS. 1 and 2, FIG. 1 is a cross sectional view of representing a bearing assembly for a work implement on a construction machine incorporating a first embodiment of the present invention and shows the cross sectional view taken from line M—M of FIG. 7. FIG. 2 is a cross sectional view of representing a bearing assembly for a work implement on a construction machine and shows a cross sectional view taken from line N—N of FIG. 1.

The same elements as those of the work machine in shown FIG. 7 will be given the same numerals and the explanation thereof will be omitted hereafter.

Referring to FIG. 1, the free end of an arm (hereinafter referred to as "first member") 13 is provided with a boss 13a in which a pin 27 is inserted, a pair of bushings 21, 21 are pressed into the opposing end portion of the bore defined in the boss 13a. The bushings 21, 21 define respectively the bore in the boss 13a, so that the pin 27 can be pivotally inserted therein. Right and left brackets 15a, 15a of a bucket 15 (hereinafter referred to as "second member") respectively have a bore therein where the bushings 24, 24 are fixed. The pin 27 is inserted into the bore of the bushings 24, 24 and the bushings 21, 21 that are aligned along a common axis. Furthermore, as found at the left location in the drawing, a lock plate 28, which has a hole 28a through which the pin 27 inserted, is attached to the outer surface of the bracket 15a by a plurality of screws 28b. The lock plate 28 and the pin 27 are connected by a screw 29 inserted at a right angle to the axis of the pin 27 and secured by a nut 29a, which prevents the pin 27 from pivoting and falling out of the bore. In addition, the anti-wear layers 26, 26 are respectively applied on the flange end surfaces where the outer tubular member 21 and the bushing 24 face each other.

A grease pocket 37 is disposed at the middle portion of the inner surface of the boss 13, which allows a supply of grease to be available through a feeding pipe 38 and a grease nipple 39 threaded thereat. A pair of dust seals 23 are positioned between the outward end of the right and left bushings and the pin to prevent the entry of dirt. A pair of dust seals 25 are installed adjacent of the sliding surfaces of the bushings 24, 24 and 21, 21.

Next, referring to FIG. 2, anti-wear layer 26 is brazed with a plurality of anti-wear plates 26a, which were previously formed into sintered hard alloy into segment-shaped thin plates, so that each of them can take form of an annular shaped anti-wear plate on the sliding surface of the flange. Alternatively, the anti-wear layer can be directly brazed with a annular shaped thin anti-wear plate, which was previously made by sinter forming into a hard alloy on the sliding surface of flange. In addition, the anti-wear layer 26 can be directly sprayed with sintered hard alloy on the sliding surfaces of flanges.

While the bushings 24, 21 are respectively fixed in the flange sides of the brackets 15a and the boss 13a, which face each other in the present embodiment, in another embodiment the bushings can be fixed within either the brackets 15a or the boss 13a. The anti-wear layer 26 can be formed by spraying sintered hard alloy on the sliding surface of another bracket 15a or boss 13a.

The operations and advantageous effects of this embodiment are described as follows.

(1) Since the bushing 24, 21 are fixed in the bore of either the brackets 15a, 15a or boss 13a, they will not fall out with use. When the bushing 24, 21 are found damaged or worn, only the bushings need replacement, thereby simplifying maintenance.

(2) Pressing a bushing 24, 21 into the bore of the brackets 15a and boss 13a permits a flexible selection of the materials for the bushings, which selection is independent of the material used for the bracket and the boss, thereby enabling overall improved slideability and abrasive resistance while reducing total cost.

(3) When the bushings 21, 21 fixed in the boss 13a are supporting a heavy load incurred by a work implement, it is necessary to prevent scuffing as they pivot around the pin 27. According to the present invention, applying an anti-wear layer on the flange end surfaces of the bushings 21, 21 which face the opposing brackets 15a, 15a provides excellent durability against abrasive wear as well as allowing a flexible selection of materials for slideability. This arrangement results in the bushings 21, 21 fixed in the boss 13a to synergistically obtain both excellent durability and slideability.

(4) Since the purpose of the bushings 24, 24 fixed in the brackets 15a, 15a is to support a pin 27, all the designer has to do is to select a proper material having excellent durability against abrasive wear that can be easily molded for the anti-wear layer 26, which is disposed on the flange end surfaces of the bushings 24, 24 facing towards the boss 13a. The selection can include making the bushings 24, 24 of plain steel, and forming the anti-wear layer by brazing with an anti-wear plate having a high wear resistance on the flange end surface thereof, so that they are used as maintenance free parts. On the other hand, the selection can include making the bushings 24, 24 of hardened steel, and forming the anti-wear layer by spraying with an anti-wear layer on the end surface of the hardened flange thereof, so that they are used as periodical maintenance parts. Alternatively, the selection can include making the bushings 24, 24 of heat-treated steel having a hard surface by carbonizing or induction hardening, so that they are used as periodical replacement parts. This allows the designer flexibility in the overall design for determining the durability and maintenance methods of the bushing in consideration of the required total cost. As a result, a bushing that is high in durability can be obtained at a low cost.

(5) A low thermal equivalent of the bushings 21, 24 due to small mass as a unit can undergo a simple heating process (i.e., in a furnace, burner and high frequency induction furnace) where anti-wear layers 26, 26 can be provided by brazing with the anti-wear plate that was previously prepared by sinter forming the annular sheet of sintered hard alloy, and positioning them on the flange end surfaces of the bushings 21, 24. Similarly, the anti-wear layer 26 can be provided by brazing with a plurality of anti-wear plates 26a, which were previously prepared by sinter forming sintered hard alloy into thin segment shaped-plates, so that each of the thin segment shaped-plates can take the form of an annular shaped anti-wear plate on the sliding surfaces of flanges.

Thus, the thickness of the anti-wear layer 26 (segment shaped anti-wear plate 26a) can be increased. For example, several millimeter-thick anti-wear layers can be brazed together. With such a construction, even if the base material of the flange portion of the bushing does not appear sufficiently hard, an optimum selection of the base material can prevent potential cracking and peeling of the anti-wear layers, even though some impressions occur thereon, as well as prolonging the bushing wear life and providing a maintenance-free bushing. This allows the bushing of the present embodiment to have a wide application in a heavy-duty construction machine.

(6) In combination with the bushing 21 within the boss 13a and the bushing 24 within the bracket 15a, the anti-wear layers can be disposed on the flange end surfaces of the bushing fixed in the bore of either one of the brackets 15a or the boss 13a, while a hard facing heat treatment steel; which is lower than the anti-wear layer in hardness, such as sintered steel or induction hardening steel; is disposed on the flange end surface of another bushing. For example, the anti-wear layers can be disposed on the flange end surfaces of the bushings fixed in the bore of the boss 13a, while a heat treatment steel is used as anti-wear layers on the flange end surfaces of the bushing in the bores of the bosses 15a, 15a. This structure causes abrasive wear to center on the hard portion on the flange end surface. Thus, a low-priced bushing due to the absence of bearing performance can be replaced with fresh or new parts on a periodic maintenance schedule, which provides excellent durability and reduces the total cost.

(7) The gathering of each small segment-shaped anti-wear plate for anti-wear layers 26 reduces the potential plain-strain that occurs during the sinter forming process along with increasing the ease of sinter forming, thereby assuring the flatness of the anti-wear layers.

(8) The bushings 21, 24 as a unit are small in size and easy to handle, so that the anti-wear layer 26 can be applied by spraying them directly with a sintered hard alloy metal, such as a tungsten carbide and the like, on the flange end surfaces thereof. This arrangement assures excellent durability at a low cost for a work implement of the medium-sized construction machine. Thus, a bearing assembly for the work implement is provided that has significant durability and good maintenance.

Figure 3:
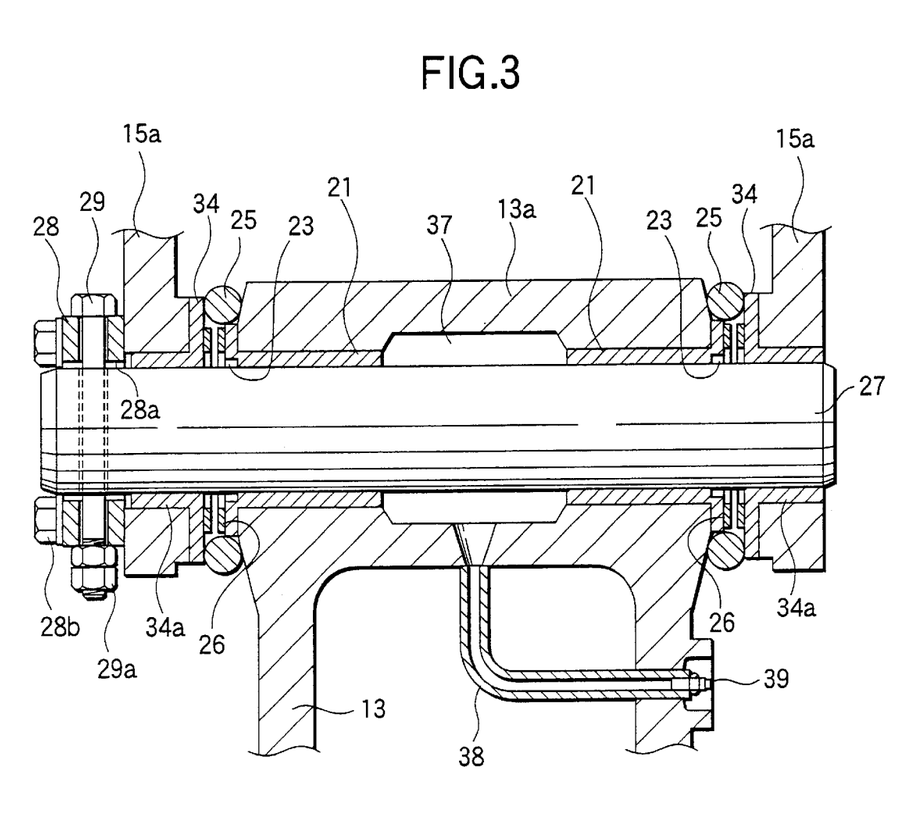
FIG. 3 is a cross sectional view of a bearing assembly for a work implement on a construction machine incorporating the second embodiment of the present invention.

Referring to FIG. 3, the second embodiment of the present invention will be described. FIG. 3 shows a sectional view of representing a bearing assembly for a work implement on a construction machine of the second embodiment of the present invention. The same elements as those of the work machine shown in FIGS. 1, 2 will be given the same numerals and the explanation thereof will be omitted hereafter.

In FIG. 3, bushings 34, 34 made of plain steel are fixed in the bore of the right and left brackets 15a, 15a. The inner sliding surfaces 34a, 34a of the bushing flanges are respectively hardened by heat treatment, such as sintering or induction hardening.

The present embodiment provides the following features in addition to that of the first embodiment.

(1) The bushings 34, 34 can be made of plain steel and hardened by heat treatment on the sliding surfaces thereof, which results in obtaining an excellent durability against abrasive wear at low cost.

(2) The flange sliding surface 34a, 34a of the bushing 34, 34 are less hard than that of the anti-wear layer 26 (formed by sintering with sintered hard alloy metal) disposed on the facing sliding surfaces of the bushings fixed in the bore of the boss 13a, which permits wear to center on the sliding surface 34a. Replacement of the bushing 34 alone, made of a low price material due to the lack of slideability, causes a reduction in total cost whatever the periodic maintenance schedule.

Figure 4:
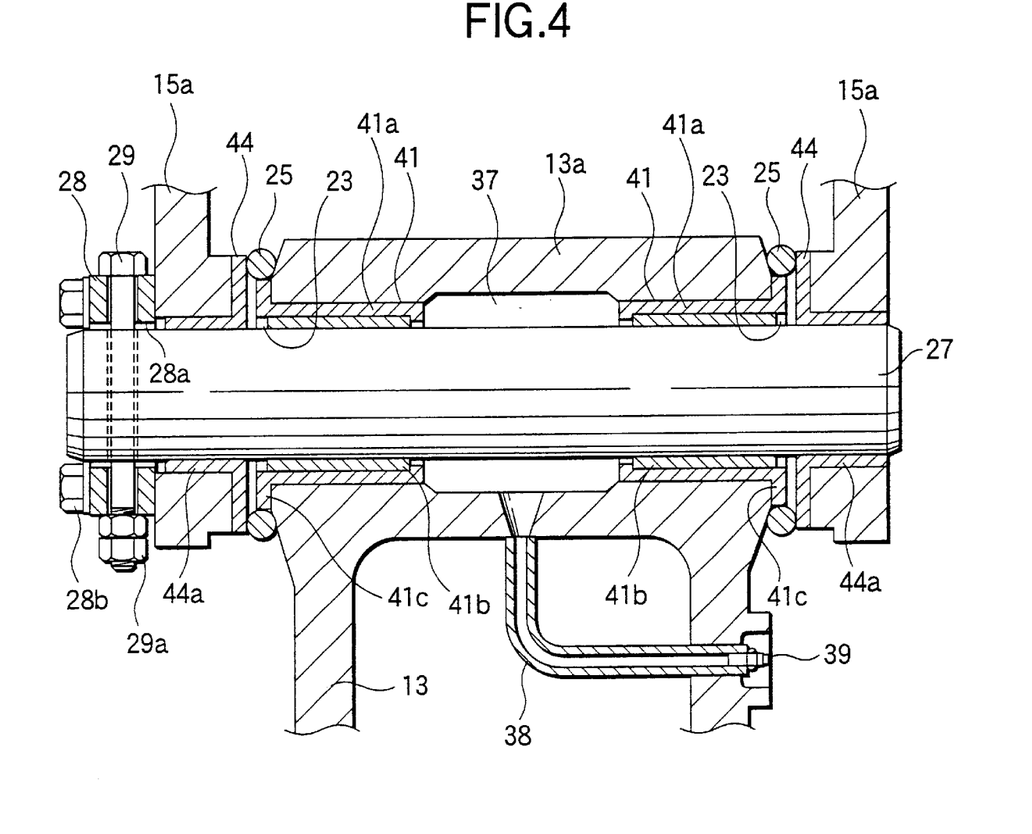
FIG. 4 is a cross sectional view of a bearing assembly for a work implement on a construction machine incorporating the third embodiment of the present invention.

Next referring to FIG. 4, the third embodiment will be explained. FIG. 4 shows a sectional view of representing a bearing assembly for a work implement on a construction machine of the third embodiment of the present invention. In FIG. 4, while the bushings 41, 41 are fixed in the bores of the right and left bosses 13a, the bushings 44, 44 are fixed in the bores of the right and left brackets 15a, 15a. The bushings 41, 41 are respectively a double-structural member including an outer tubular member with flange 41a, 41a and an inner sliding member 41b, 41b fixed in the bores thereof. The bushings 41, 44 can be made of a hard material having high abrasive resistance. The inner sliding bushings 41b, 41b are shaped in the form of tubular configuration parts and pressed into the bore of the outer tubular members with flanges 41a, 41a. The inner sliding bushings can be pressed into the outer tubular member by performing a heat treatment process or brazing process after being inserted into the bore thereof. The same is true if the inner sliding bushing 41b, 41b is a sliding member that is formed by sintering a material having a great slideability within the inner circumference of bores of the outer tubular members with flanges 41a, 41a.

The present embodiment provides the advantageous effects described below:

(1) With the bushing 44, 41 respectively fixed in at least one of the bores of the bracket 15a and boss 13a, the bushing can be inhibited from coming off and can be replaced easily with fresh parts. Slideability and excellent durability can be obtained by a tailored the selection of the material used to make parts, which has the advantageous effects described in (1) and (2) of the first embodiment.

(2) The bushings 41, 41 are each a double-structural member including an outer tubular member 41a with flange and an inner sliding member 41b fixed in the bore of the outer tubular member 41a. The bushings 41, 44 are respectively made of a hard material having high abrasive resistance. The bushings 41, 41 fixed in both sides of the bore of the boss 13a are a double-structural member including an outer tubular member 41a, 41a and an inner tubular slide member 41b, 41b pressed into the outer tubular member 41a, 41a. This arrangement permits a flexible selection of materials for the bushing flange and the inner tubular slide member through which the pin is inserted. In other words, an optimum selection of the material for the inner sliding tubular member 41b, 41b can prevent a jarring noise and abrasive wear from occurring while the bushing slides around the pin 27, especially when it receives a large radial load created from the work implement. As for the tubular member with flange 41a, 41a constituting of bushing 41, 41, a flexible selection of materials and manufacturing methods is available, where the durability against abrasive wear occurring on the flange sliding surfaces of outer tubular member 41a can be considered. This permits an excellent bearing performance and excellent durability at low cost. A replacement of either one of the outer tubular members secured within the boss or the inner sliding member with fresh parts when found damaged improves the durability of the bushing as a whole and reduces the replacement (or maintenance) expense during periodic maintenance.

(3) Since the principal function of the bushings 44, 44 fixed in the bores of the brackets 15a, 15a is to support the pin 27, the designer can select a suitable material having excellent durability against abrasive wear that is also suitable for the molding process of the anti-wear layer 26 disposed on the sliding end surfaces of the bushings 44a facing the boss 13a.

(4) The material and manufacturing methods for the outer tubular members with flanges 41a, 41a fixed at the opposing sides in the bore of the boss 13a and the bushings 44, 44 fixed in the bores of the brackets 15a, 15a can be flexibly selected respectively as explained in (2) and (3) above. The selection can include making the bushings with flanges 41a, 44 of plain steel, and forming the anti-wear layers 26 by brazing with a plurality of a highly abrasive resistant anti-wear plates on the flange end surface of thereof, thereby providing maintenance-free parts. Furthermore, the selection can include making the bushings 41a, 44 with flanges of hardened steel, and forming the anti-wear layers by spraying with an anti-wear layer on the end surface of the hardened flange thereof, thereby providing periodic maintenance parts. In addition, the selection can include making the bushings with flanges 41a, 44 of heat-treated steel that have a surface hardened by carbonizing or induction hardening, which can serve as periodical replacement parts. This again allows the designer great flexibility for the durability and maintenance methods of the bushing while keeping cost considerations in mind.

(5) In determining the durability and the maintenance methods described in (4), if the selection of the materials and/or heat treatment methods for the bushings 44 and 41 are respectively performed so that the flange end surfaces 44a, 44a of the former are higher in hardness than those of the flange end surfaces 41a, 41a of the latter, a low price bushing can be replaced during periodic maintenance. This provides significant durability as a whole and reduced total cost.

Figure 5:
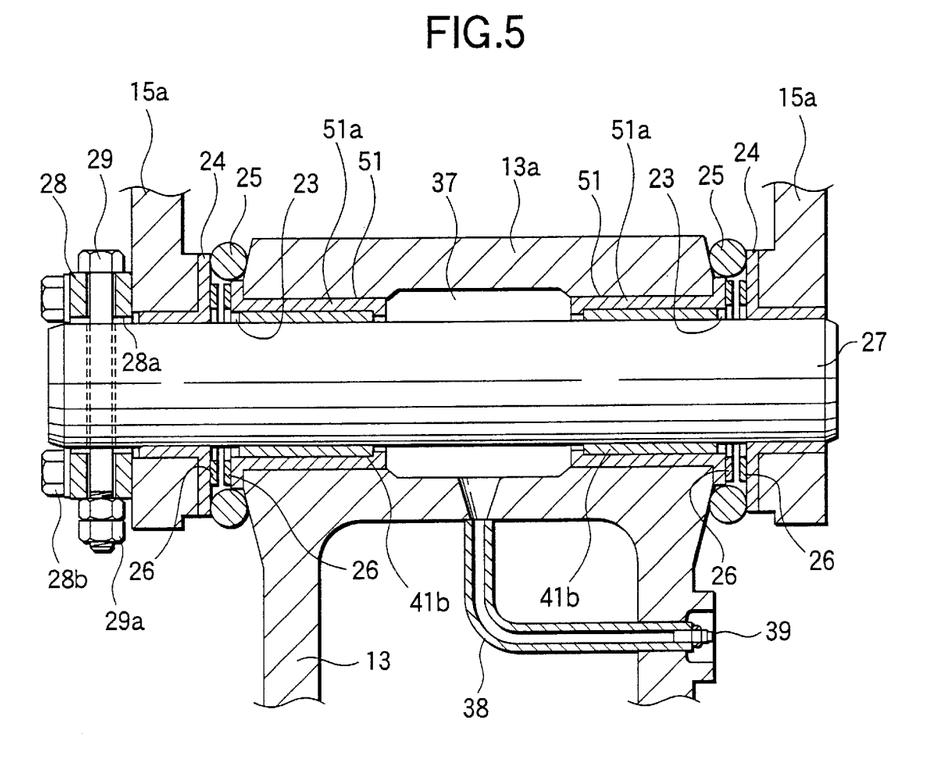
FIG. 5 is a cross sectional view of a bearing assembly for a work implement on a construction machine incorporating the fourth embodiment of the present invention.

Next, the fourth embodiment will be explained referring to FIG. 5. FIG. 5 shows a cross sectional view of a bearing assembly for a work implement on a construction machine incorporating the fourth embodiment of the present invention. In the figure, while the bushings 51a, 51a are fixed in the opposing portions of the bore of the boss 13a, the bushings with flanges 24 are respectively fixed in the bores of the right and left bosses 15a, 15a. The bushings 51 are double-structural members 41a including an outer tubular member 51A with flange and an inner sliding member 41b fixed in the bore thereof. In addition, the anti-wear layers 26, 26 are applied on the flange end surfaces of the outer tubular member 51a, 51a and the bushing 24, 24 that face each other.

The present embodiment provides the following advantageous effects in addition to those of the third embodiment.

Even if the flanges 24 and an outer tubular member 51a are made of plain steel, the anti-wear layers provided on the flanges thereof can provide an excellent durability at low cost. All of the anti-wear layers 26, as described in the first embodiment, were previously prepared by sintering or forming an annular sheet of sintered hard alloy, which results in improving the wear life of the bushing and providing a maintenance free bearing assembly. This arrangement empowers the bushing of the present embodiment with a wide application in a heavy-duty construction machine. Furthermore, the anti-wear layer 26 formed with sprayed sintered hard alloy assures an excellent durability at low cost for a work implement of the medium-sized construction machine. Thus, a bearing assembly for the work implement is provided that has an excellent bearing performance, excellent durability and easy maintenance at low cost.

Figure 6:
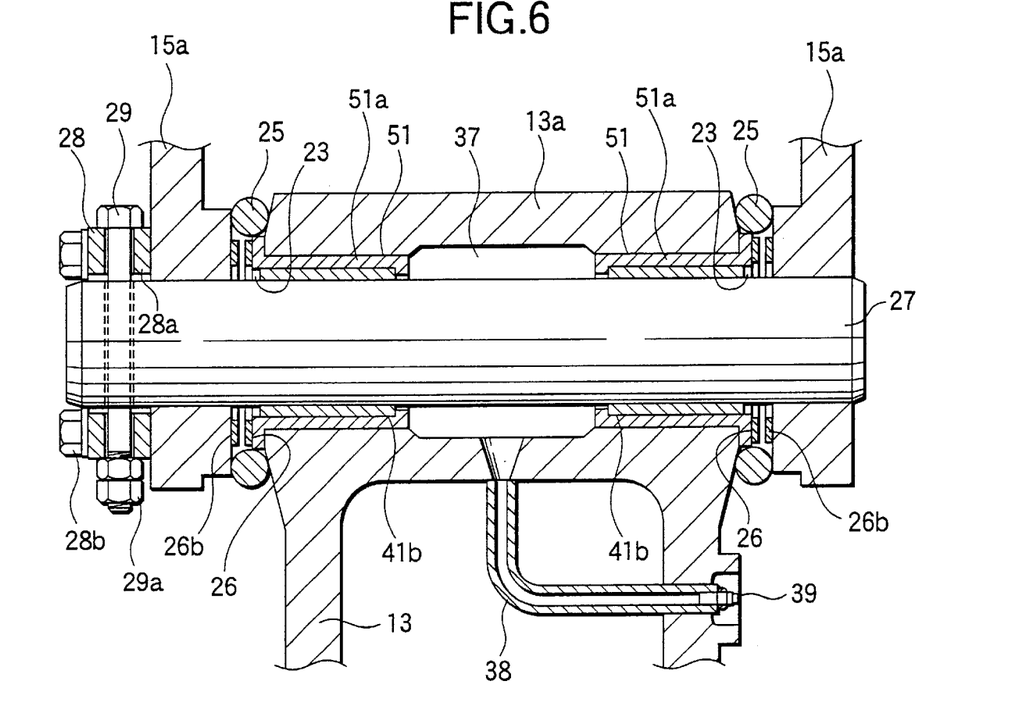
FIG. 6 is a cross sectional view of a bearing assembly for a work implement on a construction machine incorporating the fifth embodiment of the present invention.

Next, the fifth embodiment will be explained referring to FIG. 6. The present embodiment will be explained by only differentiating the structures the right and left brackets 15a, 15a in the fourth and fifth embodiments. FIG. 6 shows a cross sectional view representing a bearing assembly for a work implement on a construction machine, in accordance with the fifth embodiment of the present invention and another embodiment illustrated in FIG. 5. The double-structural bushings 51, 51 or the bushings 14, 14 are fixed in the opposing portions of bore of the boss 13a. The anti-wear layers 26 are applied on the flange sliding surfaces of the outer tubular members 51a or 41a fixed in the opposing portions of the bore of the boss 13a and the right and left brackets 15a, which face toward each other. As described in detail in the first embodiment, the anti-wear plate can be previously made by sinter forming an annular shaped plate of sintered hard alloy and then respectively attached by brazing on the sliding surfaces of the bracket 15a, 15a. The anti-wear layers 26 can be applied on the flange end surfaces of the outer tubular members 51a fixed in the opposing portions of the bore of the boss 13a as in the previous embodiment.

(1) The present embodiment provides the following advantageous effects. Each of the bushings 51, 51 (or 41, 41) fixed in the bore of the boss 13a are respectively double-structural members, including an outer tubular member 51a, 51a (or 41a, 41a) and a inner sliding member (41b, 41b) pressed into the bore of the outer tubular member, which result in providing the same advantageous effects of the bushings with flanges 41, 51 as in the fourth and fifth embodiments.

(2) Since expensive material is used for only the anti-wear layer portion (anti-wear layer 26 applied on the outer tubular members 51a, 51a or 41a, 41a) and the flange sliding surfaces 41b, 41b of the bushings, this arrangement can provide excellent durability at low cost.

While the invention has been illustrated and described as a hydraulic excavator in detail in the drawings and foregoing description, such illustration and description is to be considered as exemplary and not restrictive in character. The present invention is widely adopted for use as a bearing assembly for a work implement of a construction machine where the brackets of the second member are pivotally connected to the boss of the first member at the central portion of a pin, providing the advantageous effects as described above. It is understood that only the preferred embodiment has been shown and described and that all changes and modifications that come within the spirit of the invention are encompassed by it.

What we claim is:

1. A bearing assembly used for a work implement of a construction machine wherein a boss of a first member and a pair of brackets of a second member are pivotally connected by a pin, the bearing assembly comprising:

a pair of first bushings with flanges and a pair of second bushings with flanges are fixed respectively in the bores of the boss and brackets in a manner such that the flanges of the first bushing flanges face the flanges of the second bushing; and anti-wear hardened material is disposed on at least one of the sliding surfaces of the flanges of the first and second bushing facing each other.

2. A bearing assembly according to claim 1, wherein said first bushings include respectively a double-structural member including an outer tubular member with a flange and an inner sliding member fixed in the bore of the outer tubular member.

3. A bearing assembly according to claim 1, wherein said anti-wear hardened material is a sintered hard alloy.

* * * * *